(12) United States Patent
Holroyd et al.

(10) Patent No.: US 11,225,290 B2
(45) Date of Patent: Jan. 18, 2022

(54) VEHICLE

(71) Applicant: Polaris Industries Inc., Medina, MN (US)

(72) Inventors: James AJ Holroyd, Stillwater, MN (US); William S. Maher, White Bear Lake, MN (US); Juan M. Gonzalez, White Bear Township, MN (US)

(73) Assignee: Polaris Industries Inc., Medina, MN (US)

(*) Notice: Subject to any disclaimer, the term of this patent is extended or adjusted under 35 U.S.C. 154(b) by 191 days.

(21) Appl. No.: 15/656,723

(22) Filed: Jul. 21, 2017

(65) Prior Publication Data
US 2019/0023327 A1 Jan. 24, 2019

(51) Int. Cl.
| | |
|---|---|
| *B62D 25/18* | (2006.01) |
| *B62D 29/00* | (2006.01) |
| *B62D 65/16* | (2006.01) |
| *B62D 27/02* | (2006.01) |
| *B62D 25/16* | (2006.01) |
| *B62D 61/06* | (2006.01) |

(52) U.S. Cl.
CPC .......... *B62D 25/18* (2013.01); *B62D 25/166* (2013.01); *B62D 27/026* (2013.01); *B62D 29/008* (2013.01); *B62D 65/16* (2013.01); *B62D 61/065* (2013.01)

(58) Field of Classification Search
CPC ...... B62D 25/18; B62D 29/008; B62D 65/16; B62D 25/166; B62D 27/026; B62D 61/065
USPC .............. 296/29, 30, 198, 205, 203.01, 204, 296/203.02, 203.03, 203.04, 209, 187.03, 296/193.06, 193.07, 146.6, 187.02, 296/187.11; 293/102, 120, 121, 155
See application file for complete search history.

(56) References Cited

U.S. PATENT DOCUMENTS

| | | | |
|---|---|---|---|
| 5,226,695 A * | 7/1993 | Flint | B60R 19/24 296/191 |
| 7,036,837 B1 | 5/2006 | Bauer | |
| 8,544,587 B2 | 10/2013 | Holroyd | |
| 9,469,374 B2 | 10/2016 | Ziliak | |

(Continued)

FOREIGN PATENT DOCUMENTS

| | | |
|---|---|---|
| DE | 3401631 | 7/1985 |
| EP | 0411262 | 2/1991 |
| EP | 0913320 | 5/1999 |

OTHER PUBLICATIONS

Office Action issued by the Canadian Intellectual Property Office, dated Apr. 20, 2020, for Canadian Patent Application No. 3,011,835; 4 pages.

*Primary Examiner* — Joseph D. Pape
*Assistant Examiner* — Dana D Ivey
(74) *Attorney, Agent, or Firm* — Faegre Drinker Biddle & Reath LLP

(57) ABSTRACT

A vehicle structural support is disclosed having first and second metallic members. A first metallic member has first and second sides, where the second side has a reduced thickness section. A second metallic member is coupled to a first side of the first metallic member. A third member is coupled to the first metallic member and positioned in the reduced thickness section. The second metallic member extends beyond the reduced thickness section to at least partially overlap the third member. The third member may be a fender for a vehicle.

54 Claims, 15 Drawing Sheets

(56) References Cited

U.S. PATENT DOCUMENTS

| | | | | |
|---|---|---|---|---|
| 2011/0278880 | A1* | 11/2011 | Tsuyuzaki | B62D 25/087 296/187.11 |
| 2014/0262580 | A1* | 9/2014 | Bagnariol | B62K 19/18 180/218 |
| 2015/0021956 | A1* | 1/2015 | Courtright | B62D 25/082 296/203.03 |
| 2015/0274213 | A1* | 10/2015 | Rudwal | B62D 25/18 280/154 |

* cited by examiner

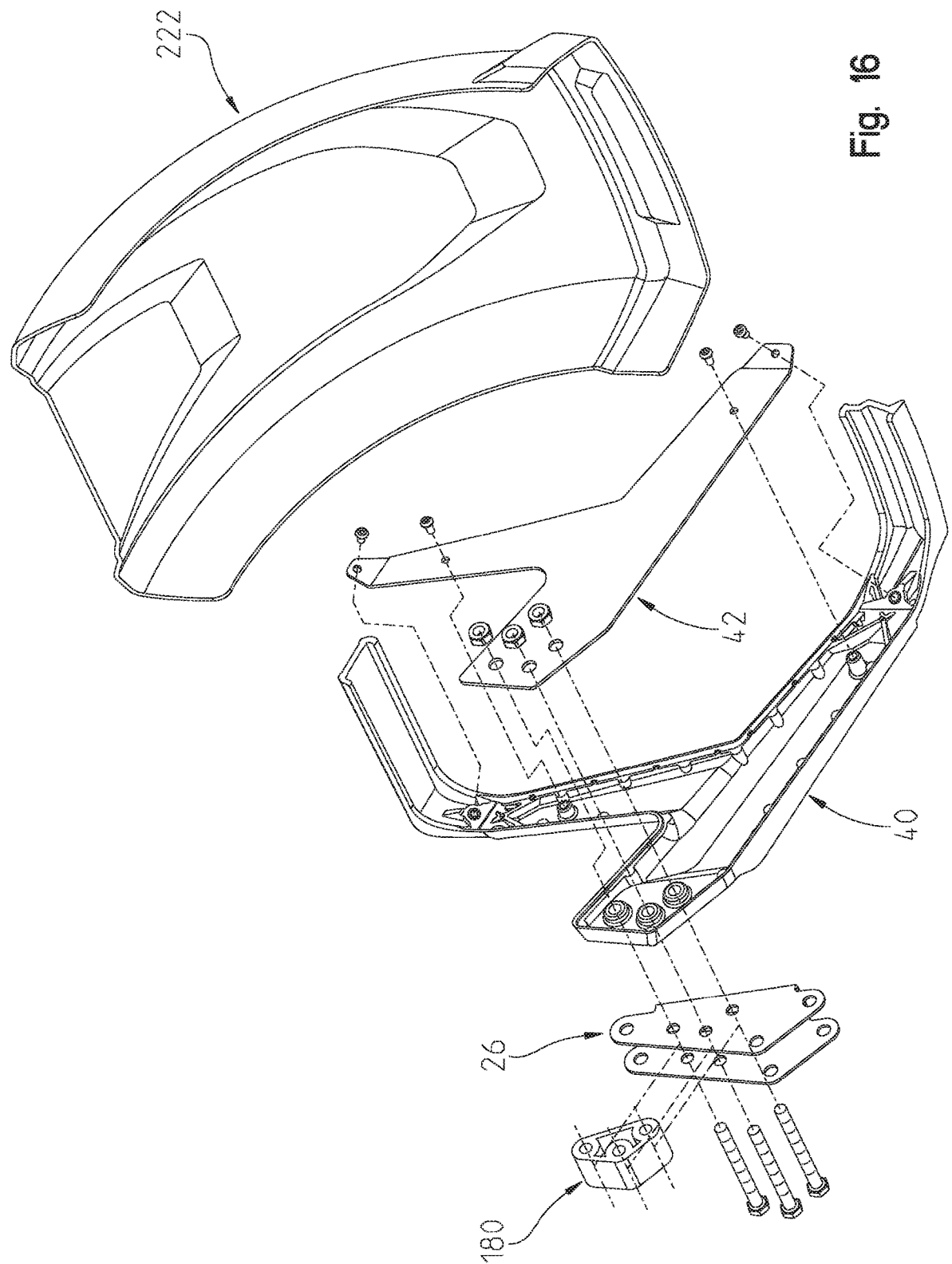

VEHICLE

BACKGROUND

The present application relates generally to a structural member for mounting components to a vehicle, and particularly for mounting a fender to a vehicle.

Multiple different vehicle types are known, for example, two to four wheeled vehicles. It is customary to provide a fender over at least some of the wheels, which is coupled at least indirectly to the frame of the vehicle. The vehicle is described herein in the context of the vehicle type shown in U.S. Pat. No. 8,695,746; and in the context of the vehicle type shown in U.S. patent application Ser. No. 15/595,628; the subject matter of which are incorporated herein by reference. The subject disclosure is applicable to all types of such vehicles.

SUMMARY

In a first embodiment of the invention, a method of making a load bearing metallic tubular structure comprises the steps of forming a first metallic channel member having an open face; forming a second metallic member from a different composition than the first metallic member; and coupling the second metallic member over the open face of the first metallic channel member.

In another embodiment, a load bearing metallic tubular structure comprises a first metallic channel member having an open face; a second metallic member of different composition than the first metallic member; wherein the second metallic member is coupled over the open face of the first metallic channel member.

In another embodiment, a vehicle structural support comprises a first metallic member having first and second sides, the second side having a reduced thickness section; a second metallic member coupled to a first side of the first metallic member; a third member coupled to the first metallic member and positioned in the reduced thickness section; and wherein the second metallic member extends beyond the reduced thickness section to at least partially overlap the third member.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

The invention will now be described in relation to the drawing figures where:

FIG. 16 is an exploded view of the fender assembly of FIG. 15.

DETAILED DESCRIPTION OF THE EMBODIMENTS

Figure 1:
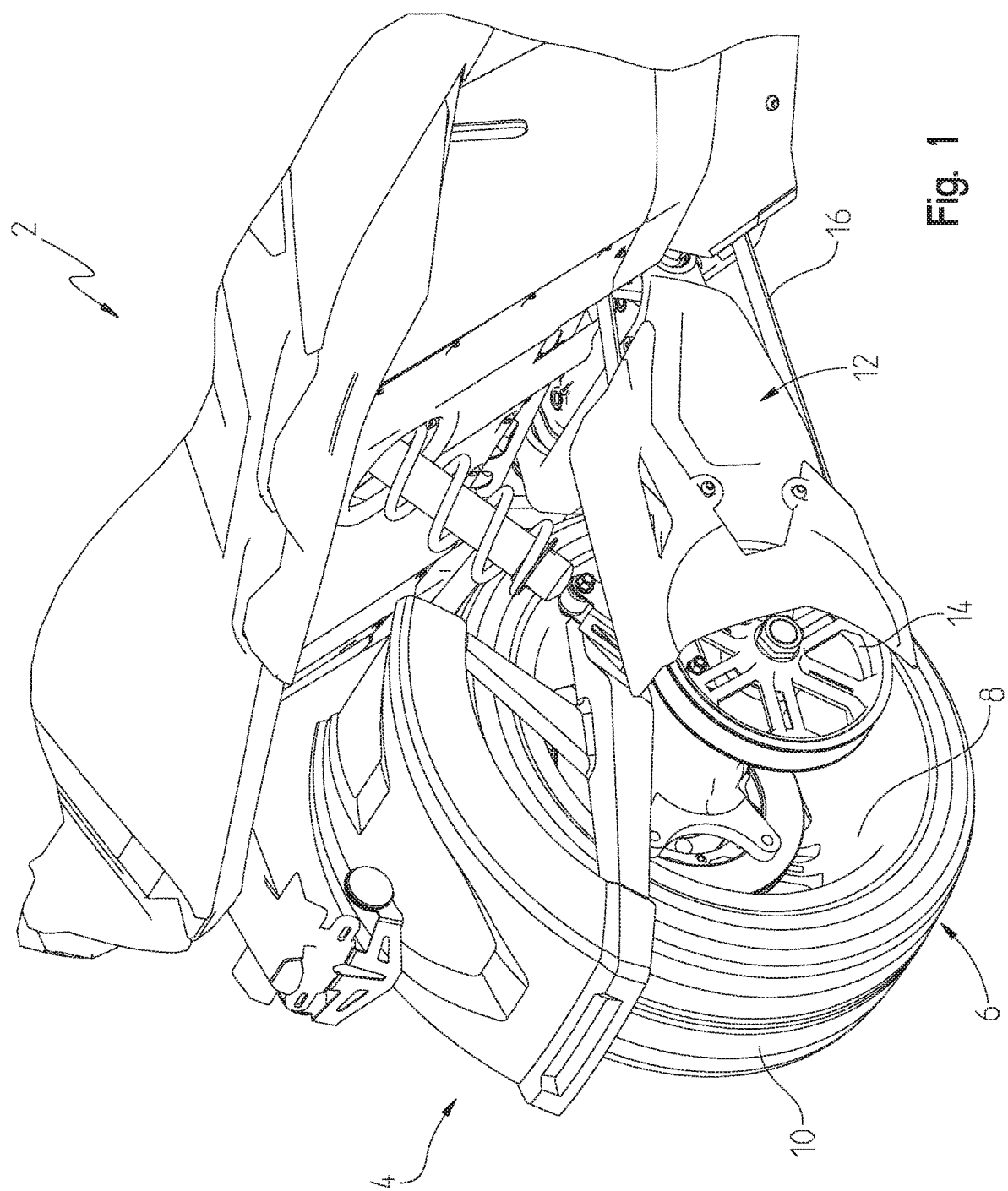
FIG. 1 is a right rear perspective view partially fragmented of a vehicle rear wheel and fender.
Figure 2:
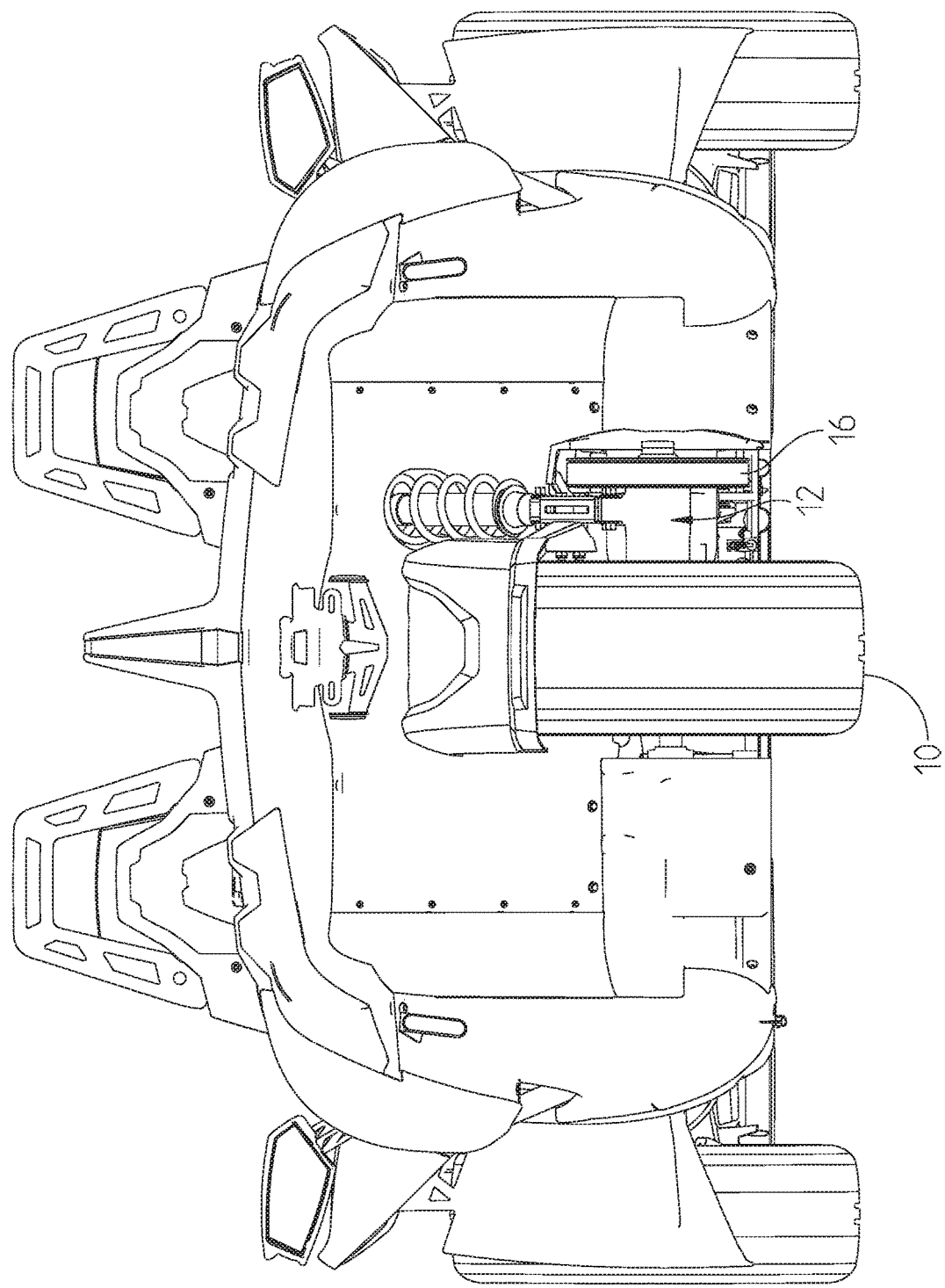
FIG. 2 is a rear view of the vehicle of FIG. 1.
Figure 3:
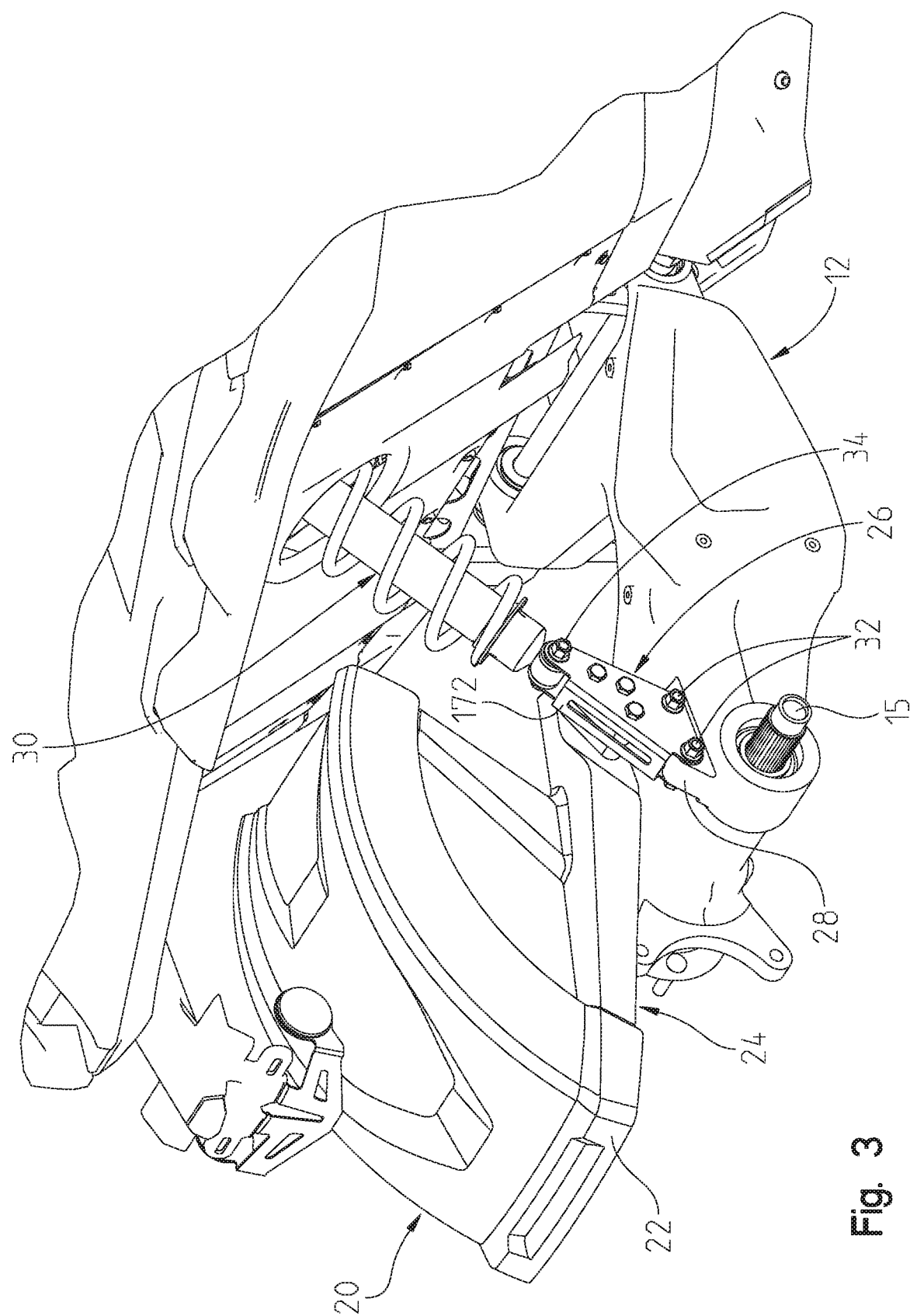
FIG. 3 is a view similar to that of FIG. 1 with the wheel removed.

With reference first to FIGS. 1-3, a vehicle is shown at 2 and will be described in greater detail. With reference first to FIG. 1, the vehicle 2 includes a rear suspension 4 coupling a rear wheel 6 to the vehicle 2. The rear wheel 6 includes a rim 8 and a tire 10. The wheel 6 is coupled to the vehicle 2 by way of a swing arm 12. A sprocket 14 is coupled to the rim 8 by way of an axle 15 (FIG. 3), and a belt 16 drives the sprocket 14 and axle 15 by way of a powertrain, not shown. In the embodiment shown, vehicle 2 is of the vehicle type shown in U.S. Pat. No. 8,695,746, the subject matter of which is incorporated herein by reference. The vehicle shown in FIGS. 1-3 is better shown in U.S. patent application Ser. No. 15/595,628; the subject matter of which is incorporated herein by reference.

With reference now to FIG. 3, a fender assembly is shown at 20 and includes a fender 22 and a fender bracket 24. The fender assembly 20 is coupled to the vehicle by way of a clevis 26 which couples to a lug 28 on the swing arm 12. At the same time, the clevis 26 retains a linear force element 30, such as a shock absorber, to the swing arm 12 by way of fasteners 34. As shown in FIG. 3, the clevis 26 is retained to the lug 28 by way of fasteners 32, and the fender bracket 24 is retained to the clevis 26, as described further herein. It should be appreciated then that the fender assembly 20 moves up and down with the movement of the swing arm 12.

Figure 4:
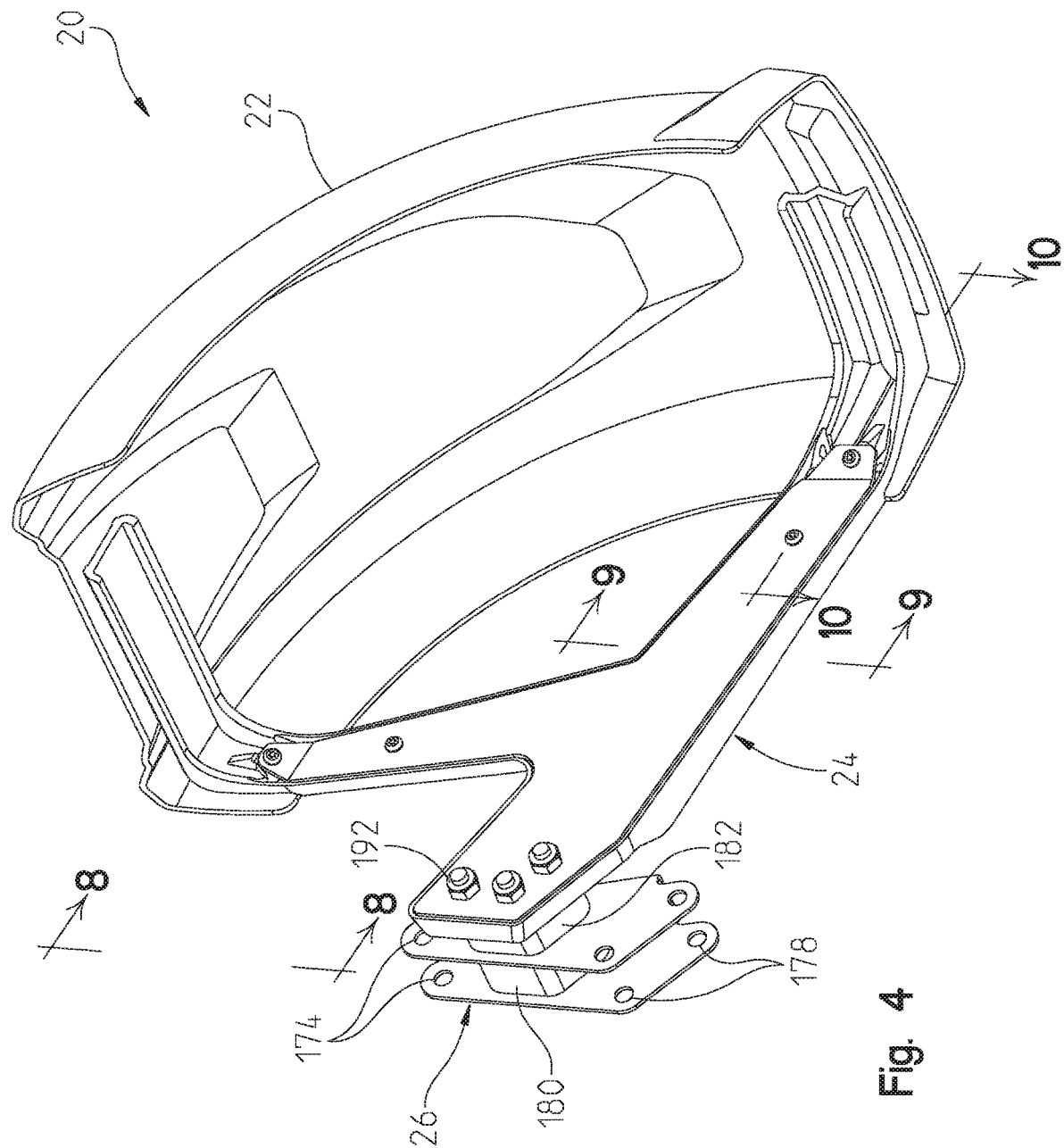
FIG. 4 is an underside perspective view of the fender assembly for the vehicle of FIG. 1.
Figure 5:
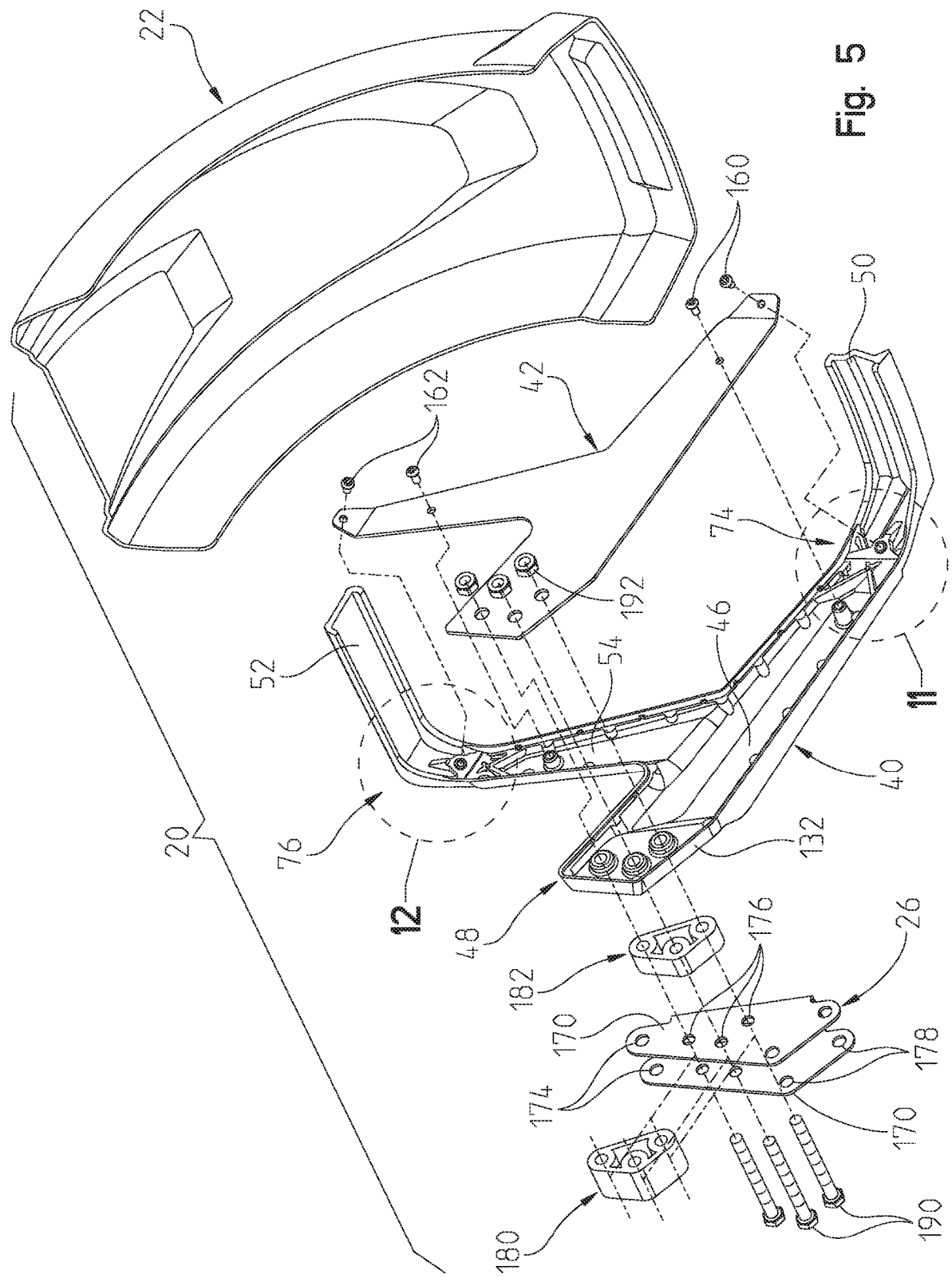
FIG. 5 is an exploded view of the fender assembly of FIG. 4.
Figure 6:
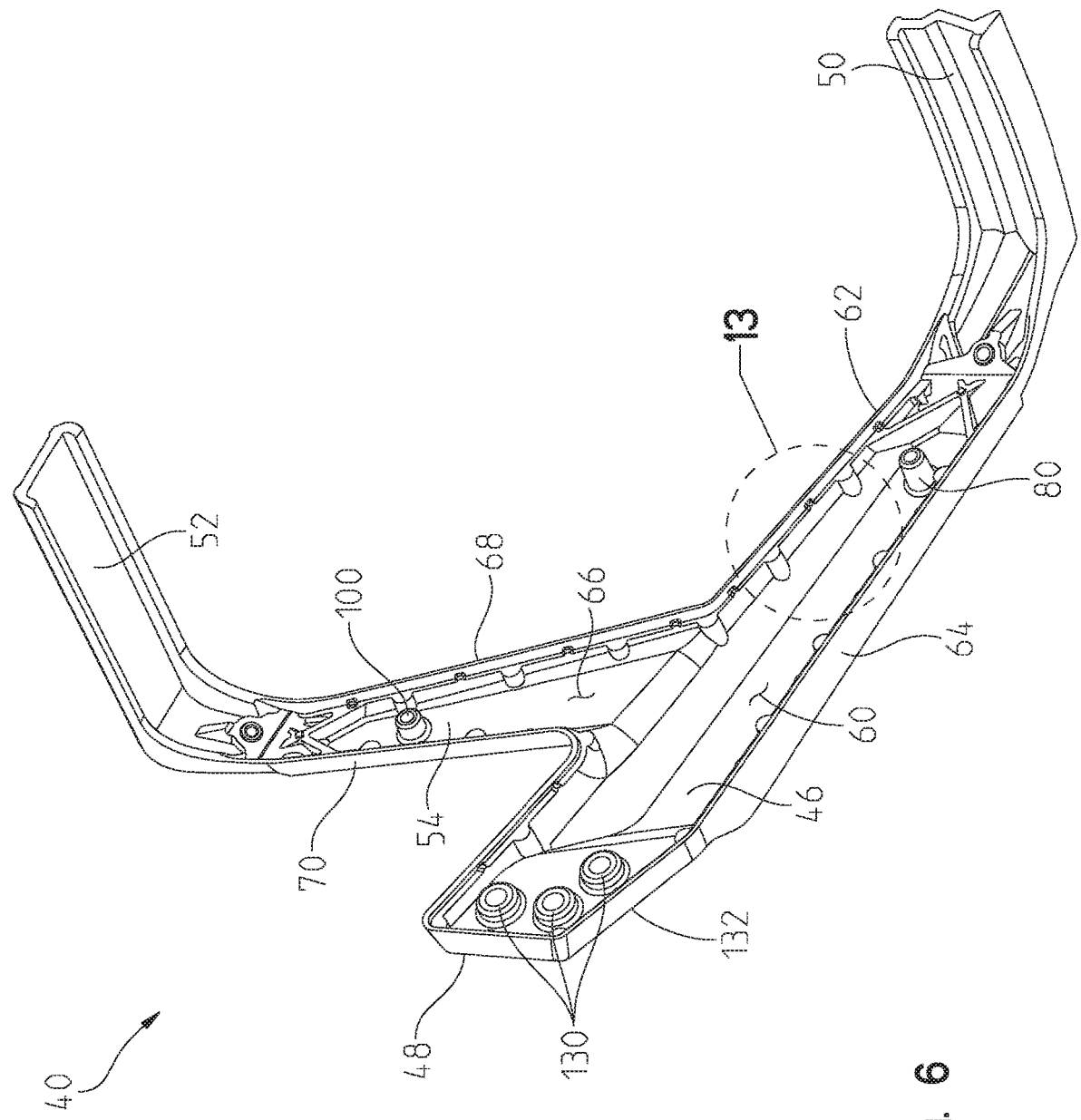
FIG. 6 is a perspective view of the fender bracket casting.

With reference now to FIGS. 4-5, the bracket assembly 20 will be described in greater detail. As shown, bracket assembly 24 is comprised of a bracket casting or channel member 40 and a bracket backing plate 42. With reference now to FIGS. 5 and 6, bracket casting 40 will be described in greater detail. As shown, bracket casting 40 includes an elongate member 46, a mounting portion 48, a rear fender mount 50, and a top fender mount 52. Top fender mount 52 is coupled to the elongate portion 46 by way of a leg portion 54. As shown best in FIG. 6, elongate portion 46 includes a base wall portion 60 with upstanding upper and lower side walls 62, 64 respectively. In a similar manner, leg portion 54 includes a base wall portion 66 which is coincident with base wall portion 60 and includes a side wall 68 which is continuous with wall portion 62 and a side wall portion 70 which mergers into mounting portion 48. As shown best in FIG. 5, fender bracket 40 includes a rearward mount 74 and an upper mount 76 for backing plate 42.

Figure 11:
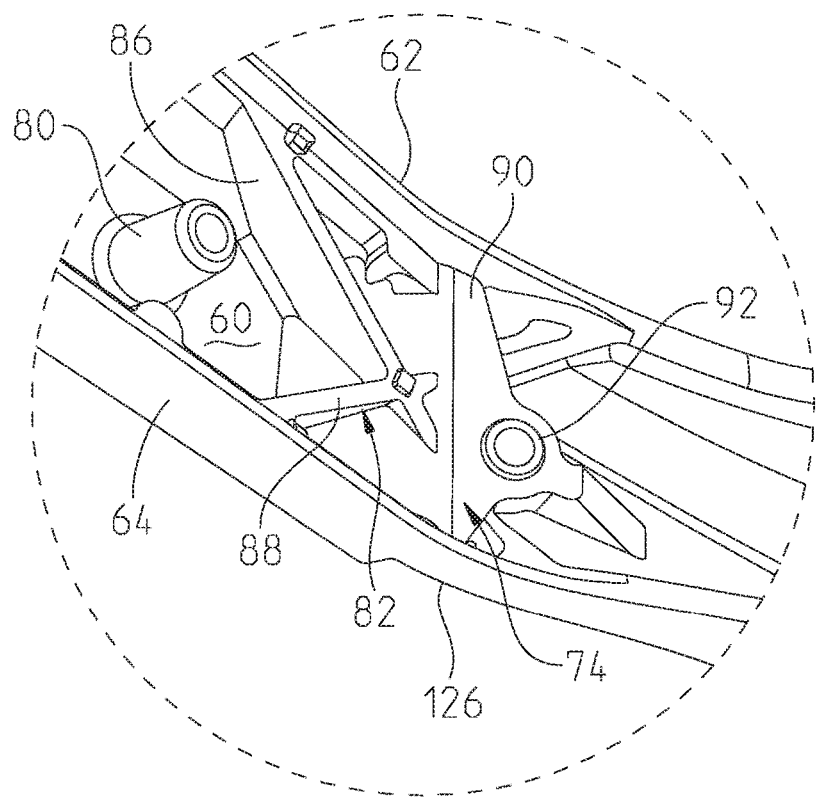
FIG. 11 is an enlarged view of the portion of the fender bracket casting denoted in FIG. 5.

With reference now to FIG. 11, mount portion 74 will be described in greater detail. As shown, mount portion 74 includes a threaded boss 80 upstanding from wall 60 as well as a cruciform-shaped truss at 82. Truss 82 includes walls 86 and 88 which intersect to form the cruciform-shape, which tapers downwardly from the left to the right as viewed in FIG. 11. Mount portion 74 also includes an angled land portion 90 which includes a threaded boss at 92.

Figure 12:
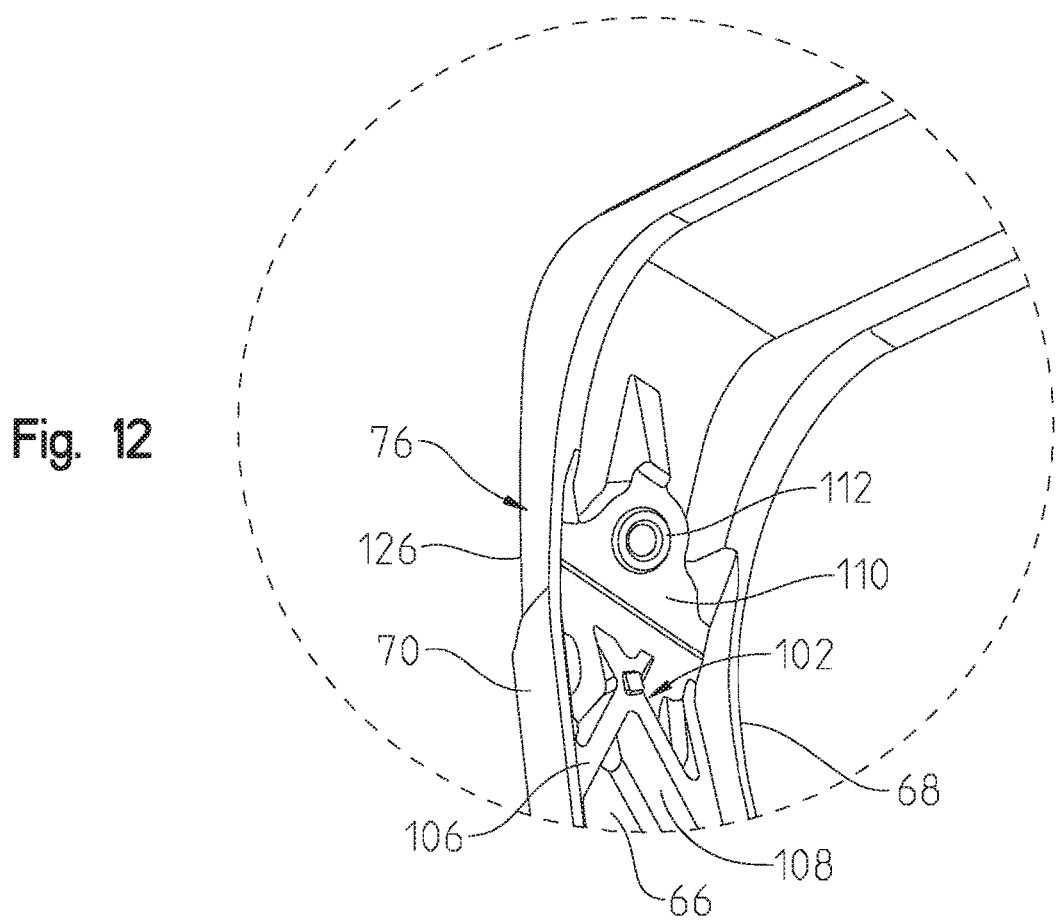
FIG. 12 is an enlarged view of the portion of the fender bracket casting denoted in FIG. 5.

With reference now to FIG. 12, mount portion 76 will be described in greater detail. As shown, mount portion 76 includes a threaded boss 100 (FIG. 6) upstanding from wall 66 as well as a cruciform-shaped truss at 102. Truss 102 includes walls 106 and 108 which intersect to form the cruciform-shape, which tapers downwardly from the lower end to the upper end as viewed in FIG. 12. Mount portion 76 also includes an angled land portion 110 which includes a threaded boss at 112.

Figure 13:
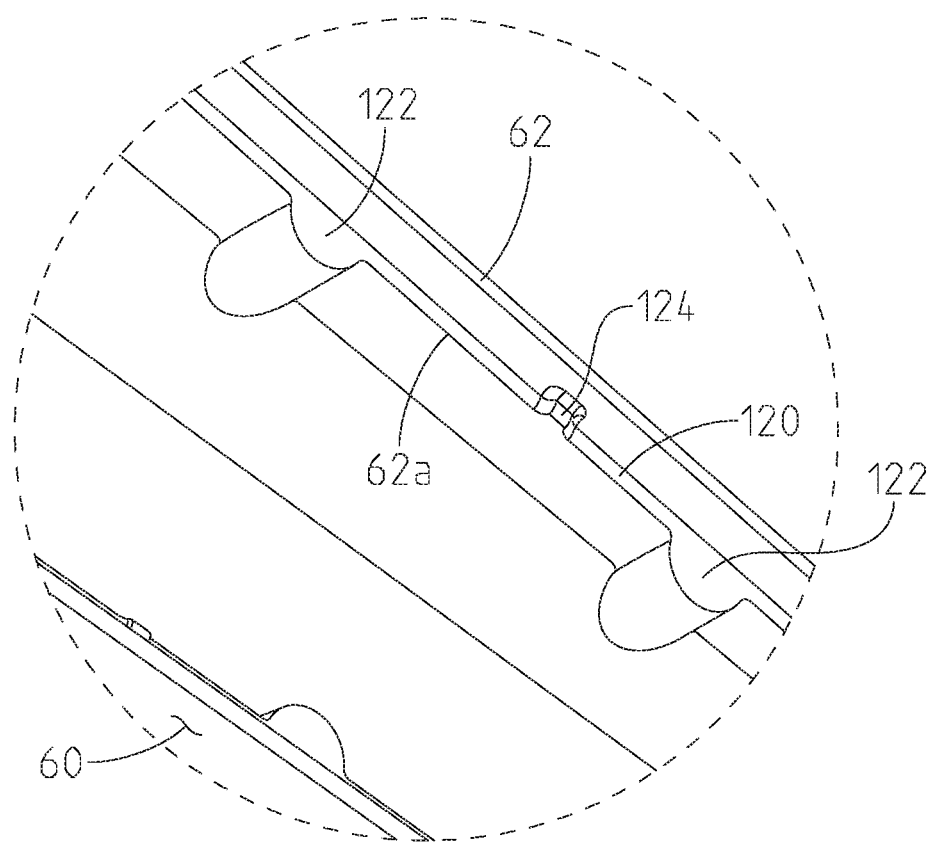
FIG. 13 is an enlarged view of the portion of the fender bracket casting denoted in FIG. 6.

With reference now to FIG. 13, sidewall 62 defines a ledge portion 120 by notching the side wall 62 from an inside surface 62a. Ledge portion 120 is notched by a dimension which is substantially the thickness of the backing plate 42, as described in greater detail below. A plurality of enlarged land portions 122 are also defined, interrupted by a plurality of standoffs or upstanding teeth at 124. As shown best in FIG. 6, the ledge portions 120, the enlarged land portions 122 and the standoffs 124 extend substantially along walls 62, 64, 68 and 70 as described herein. In addition, and as best shown in FIGS. 11 and 12, the base wall 60 is provided with a reduced thickness section 126 on an outer side thereof, and the base wall 66 is provided with a reduced thickness section 128 on an outer side thereof. Finally, with respect again to FIG. 6, mount portion 48 includes embossed apertures at 130 and an undercut portion at 132.

Figure 7:
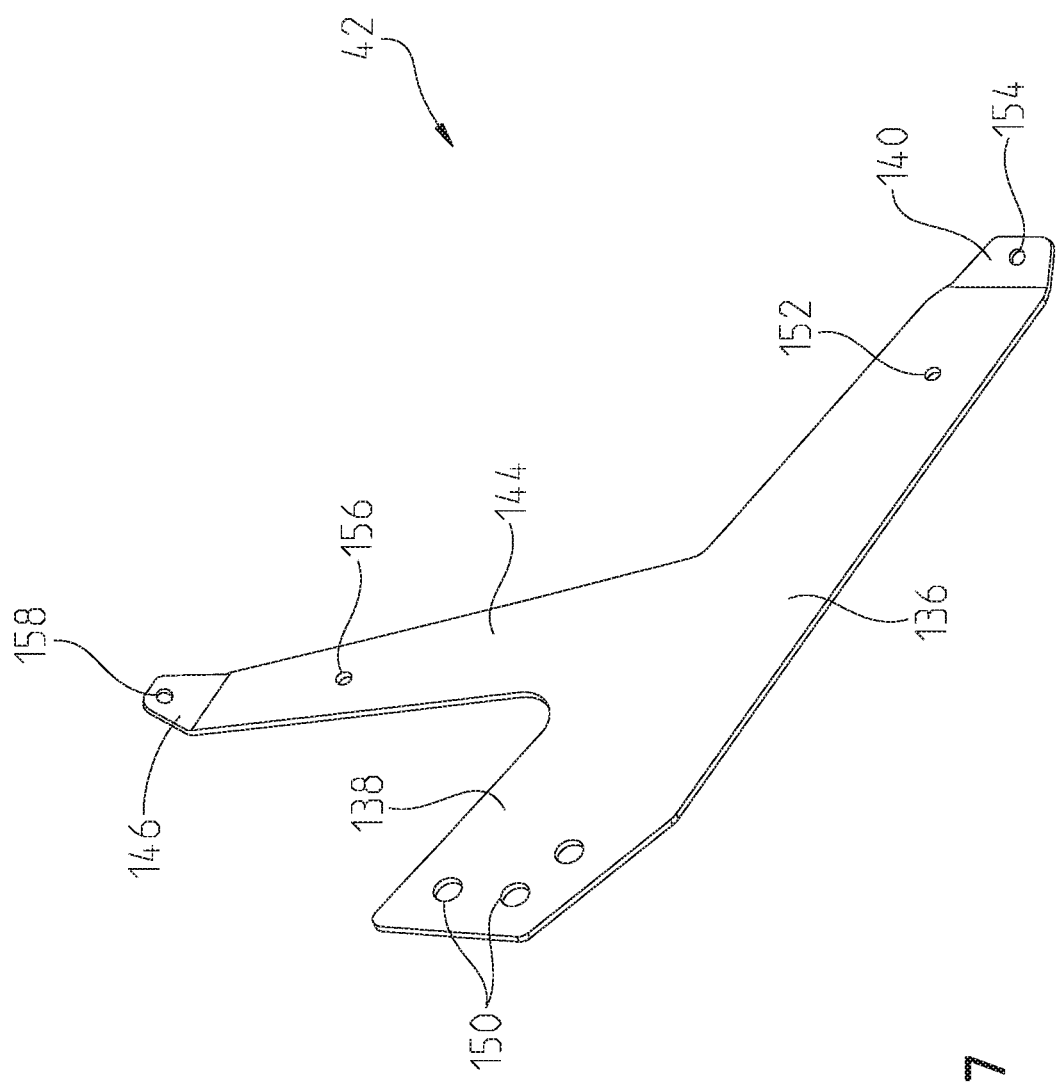
FIG. 7 is a perspective view of the fender bracket backing plate.

With reference now to FIG. 7, backing plate 42 will be described in greater detail. Backing plate 42 includes a longitudinally extending section 136 having a mount portion 138 overlying mounting portion 48 of bracket casting 40. At an opposite end, a mount portion 140 is provided which cooperates with mount portion 74 of casting 40. A vertical portion 144 cooperates with vertical leg portion 54 and has a mount portion 146 which cooperates with mount portion 76 of casting 40. Backing plate 42 includes apertures 150 which overlie embossed apertures 130, apertures 152 and 154 which overlie threaded bosses 80, 92 (FIG. 11) and apertures 156, 158 which overlie threaded bosses 100, 112 (FIGS. 6 and 12).

With reference now to FIGS. 9-13, the assembly of the bracket 24 will be described. As shown best in FIG. 9, the notching (denoted as notched area 121) of the sidewalls (Sidewall 62 for example) together with standoffs 124 defines a dimension $Y_1$ which is substantially the thickness of the backing plate 42. Furthermore the standoffs 124 define a dimension gap $Y_2$ which is an adhesive gap. Thus to assemble the bracket 24, adhesive is applied to the adhesive gap and the backing plate 42 is positioned over the bracket 40, such that apertures 152, 154 overlie threaded bosses 80, 92 respectively; and that apertures 156, 158 overlie threaded bosses 100, 112, respectively. Fasteners 160 (FIG. 5) are then positioned through backing plate 42 into threaded bosses 80, 92 and fasteners 162 are positioned through backing plate 42 into threaded bosses 100, 112.

By gluing the backing plate 42 on to the bracket casting 40, an enclosed cross section is created which greatly increases the strength of the design. This cross-section is shown best in FIG. 9. Weight is minimized by using a bracket casting 40 of cast aluminum and a backing plate 42 of stamped aluminum, as these manufacturing techniques allow for thin walled parts. The tooled die casting provides cosmetic benefit, and the stamped plate provides strength with minimal tooling cost. As there is no known cost effective method to construct a hollow die-casting, and there is no way to weld two dissimilar aluminum components, this construction method is uniquely beneficial.

In the embodiment disclosed the bracket casting is AL ADC12 and the aluminum backing plate is 6061-T6. These components are assembled using four machine screws and adhesive. In the embodiment disclosed the adhesive is 3M Scotch Weld DP420 NS Adhesive. The enlarged land portions 122 also provide increased surface area for the adhesion.

Figure 8:
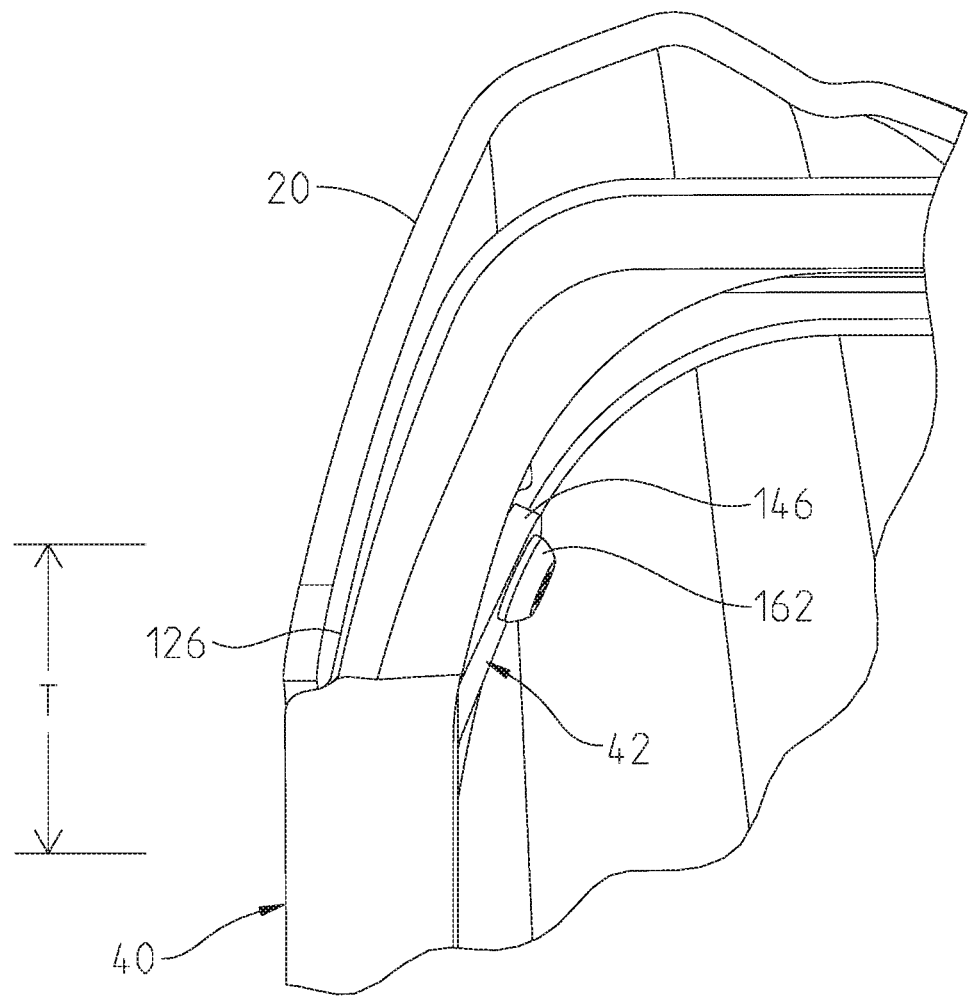
FIG. 8 is a view taken along arrows 8-8 of FIG. 4.
Figure 9:
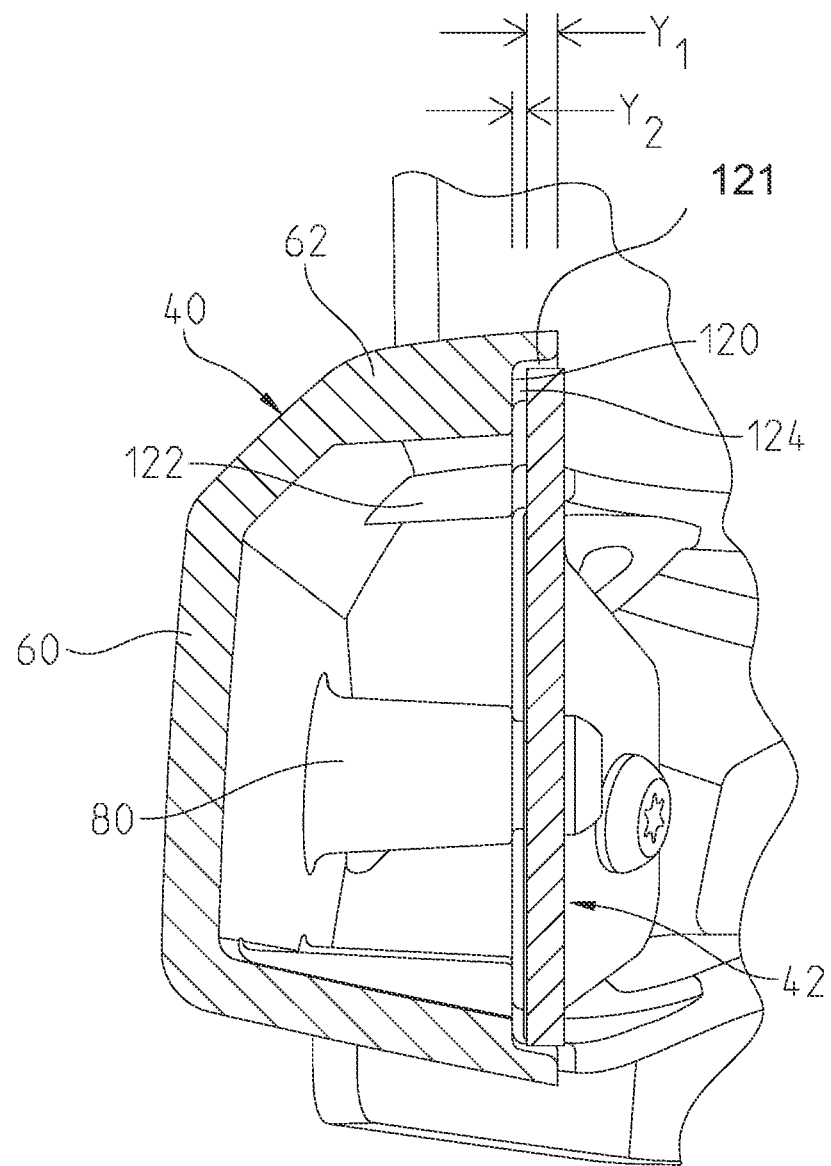
FIG. 9 is a cross-sectional view taken along arrows 9-9 of FIG. 4.
Figure 10:
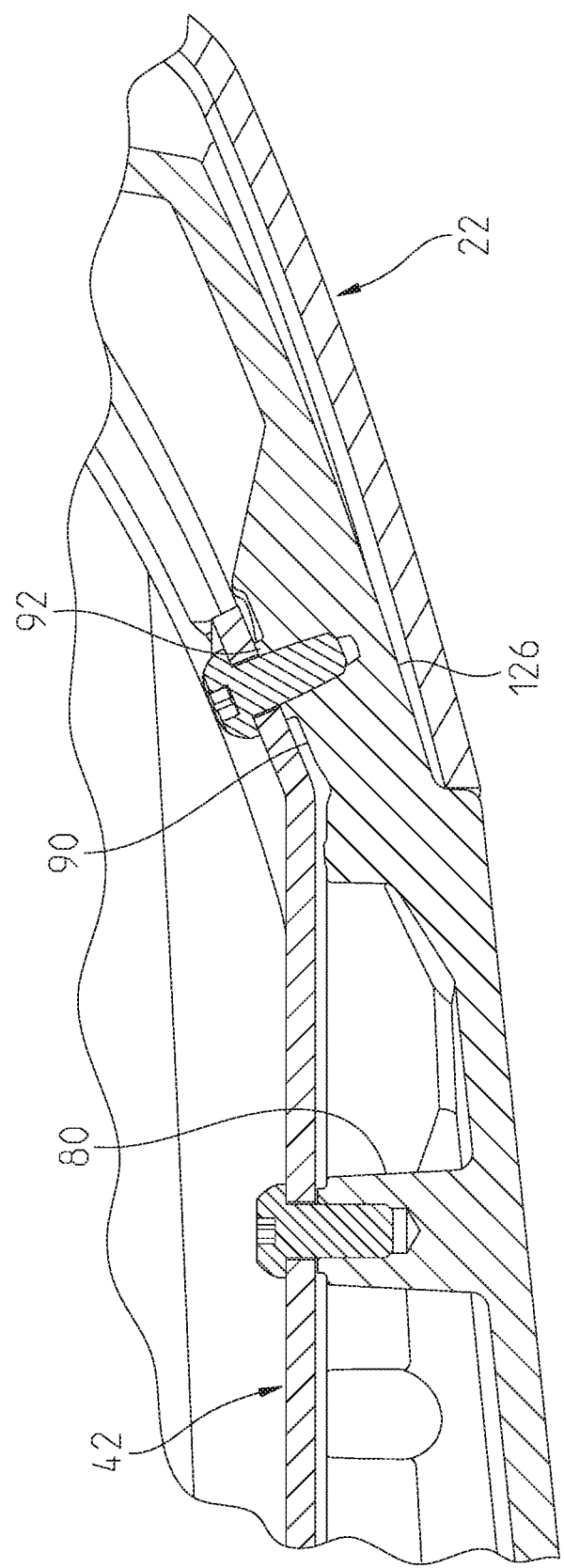
FIG. 10 is a cross-sectional view taken along arrows 10-10 of FIG. 4.

Also, and as shown in FIG. 8, the reduced thickness section 126 defines a transition zone T, which is an increased stress area due to the loading of the fender 22 and the needed geometry of the structure. In this design, the aluminum backer plate 42 and the bracket casting 40 share the stress load. Also, the bracket casting 40 has the cruciform truss 82, 102 to add strength and also adds height to allow a joint (mechanical and adhesive) between with the aluminum backer plate 42. The backer plate 42 also tapers at the ends 140, 146 to the tip to minimize the stress concentrator. Also, the backer plate 42 extends well beyond the thinning of the outside geometry, through transition zone T to minimize stress concentrators. The reduced thickness sections 126, 128 are thinner to accept the actual shape of the fender 22.

With reference to FIGS. 3, 4 and 5, the mounting of the fender assembly 20 to the swing arm 12 will be described. As shown, clevis 26 includes 2 side walls 170 (FIG. 5), coupled by an intermediate wall 172 (FIG. 3). Each of the side walls includes three sets of apertures, namely apertures 174, 176 and 178. Two spacers 180 and 182 are also provided, where spacer 180 is positioned intermediate the two side walls 170 (FIG. 4) and spacer 182 is positioned intermediate the clevis 26 and the bracket casting 40. Each of the spacers 180, 182 include apertures which align with the apertures 176 and with threaded bosses 130 (FIG. 6). Fasteners 190, 192 (FIG. 5) fasten the clevis 26 and bracket assembly 24 together (FIG. 4). Also fasteners 32 (FIG. 3) extend through apertures 178 to couple the clevis 26 and fender assembly 20 to the swing arm 12, and fasteners 34 couple the shock absorber 30 to the clevis 26. The function of spacer 182 is to center the fender 22 with the tire 10 in order to prevent interference thereof.

Figure 14:
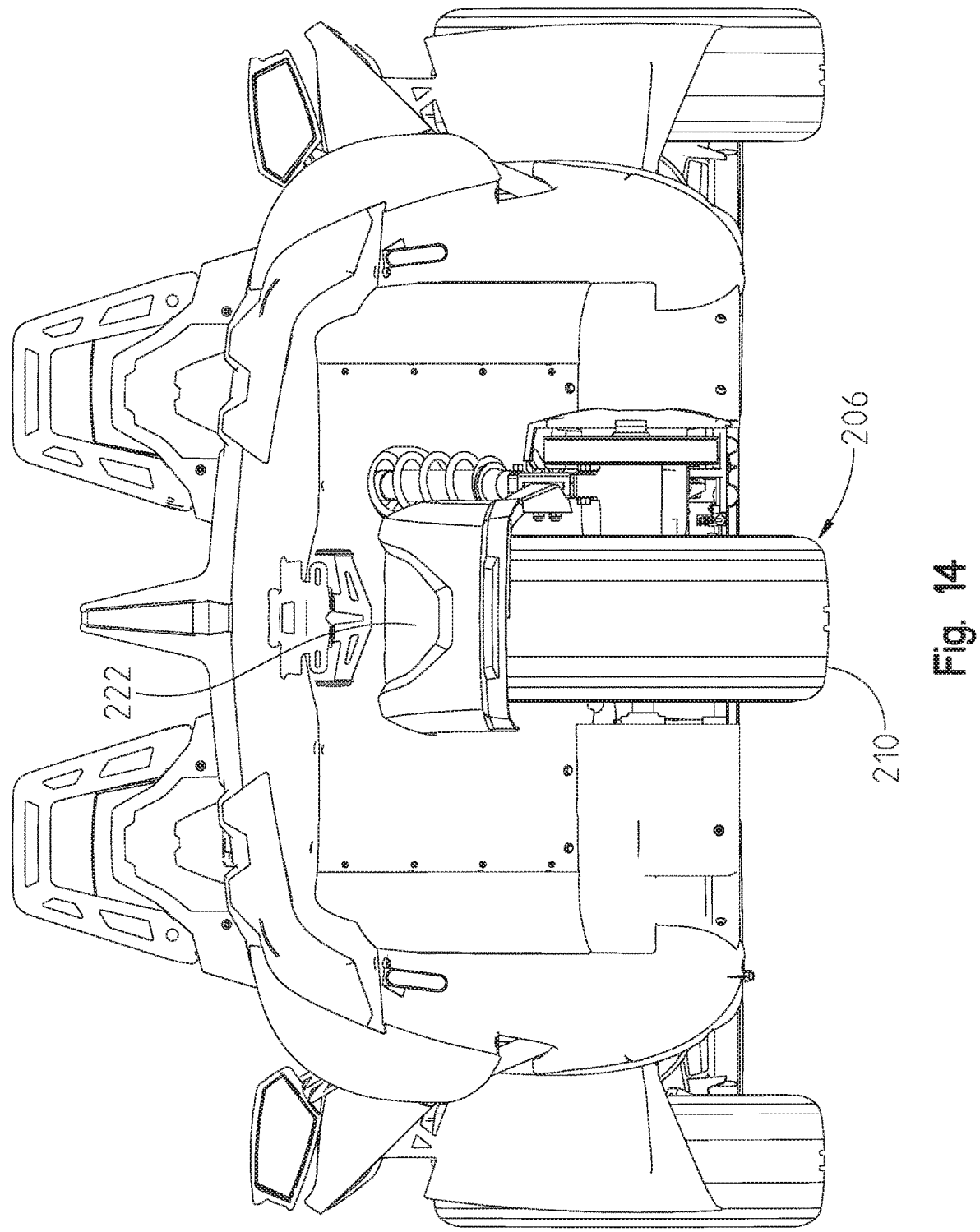
FIG. 14 is a view similar to that of FIG. 2, showing the vehicle with a wider track rear tire.
Figure 15:
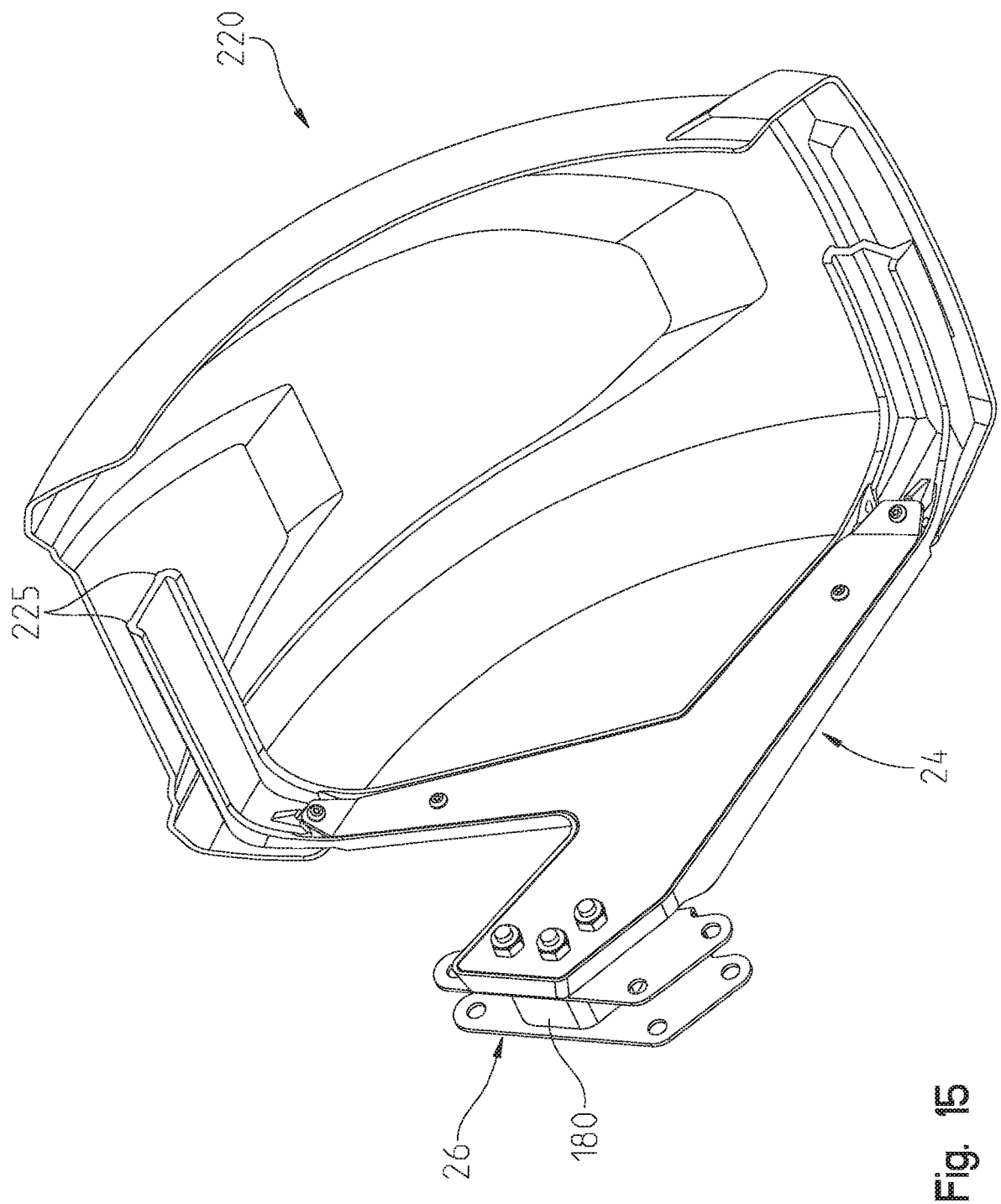
FIG. 15 is an underside perspective view of the fender assembly for the vehicle of FIG. 14.

The fender assembly 20 can also be used with wider track tires. As shown in FIGS. 14-16, a wider track wheel is shown at 206 having a wider track tire shown at 210. In this embodiment, the spacer 182 (FIG. 5) is eliminated, which centers a wider fender 222 with the tire 210 in order to prevent interference thereof. The remainder of the bracket assembly 24 remains the same.

In either case, that is, whether fender 22 or 222 is selected, the fender is attached to the bracket casting 40 by way of adhesive. As shown best in FIG. 15, the top of the bracketing has ridges 225 which form a defined depth for the adhesive gap between the fender and bracket casting 40.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A method of making a load bearing metallic tubular structure, comprising the steps of:
   forming a first metallic channel member having an open face;
   forming a second metallic member of different composition than the first metallic channel member;
   coupling the second metallic member to the first metallic channel member within a notched area of the open face of the first metallic channel member; and
   coupling a third member to the first metallic channel member, the third member defined as a fender for covering a tire.

2. The method of claim 1, wherein the first metallic channel member is formed by casting.

3. The method of claim 2, wherein the first metallic channel member is formed from cast aluminum.

4. The method of claim 3, wherein the first metallic channel member is cast AL ADC12.

5. The method of claim 3, wherein the second metallic member is in the form of a plate.

6. The method of claim 5, wherein the second metallic member is formed from a stamped aluminum plate.

7. The method of claim 6, wherein the second metallic member is stamped and formed of aluminum alloy 6061-T6.

8. The method of claim 6, wherein the first metallic channel member is formed to define side walls which extend outwardly from a base wall, and the side walls include the notched area along an inside surface thereof to receive the second metallic member.

9. The method of claim 8, wherein a plurality of upstanding teeth is formed on the notched area.

10. The method of claim 9, wherein a channel adjacent the upstanding teeth define an adhesive gap.

11. The method of claim 10, wherein the second metallic member is coupled to the first metallic channel member by adhesive.

12. The method of claim 11, wherein the first metallic channel member is formed with at least one threaded boss which upstands in the direction of the sidewalls and the second metallic member is further coupled to the first metallic channel member by way of a fastener extending through the second metallic member into the boss of the first metallic channel member.

13. The method of claim 12, wherein the first metallic channel member is further formed with a land portion, spaced from the at least one threaded boss, the land portion including a second threaded boss.

14. The method of claim 13, wherein the first metallic channel member further comprises a raised portion, intermediate the first and second bosses, which supports the second metallic member.

15. The method of claim 14, wherein the first metallic channel member further comprises a reduced thickness section on an outer surface of the base wall, intermediate the first and second bosses, which supports the third member, wherein the second metallic member extends beyond the reduced thickness section to at least partially overlap the third member.

16. The method of claim 15, wherein the fender is selected from a group of fenders including at least one narrow fender for a narrow tire and at least one wide fender for a wide tire, and the same first metallic channel member and second metallic member may be used with either the at least one narrow fender and the at least one wide fender.

17. The method of claim 1, wherein the open face of the first metallic channel member is open in a lateral direction.

18. A load bearing metallic tubular structure, comprising:
    a first metallic channel member having an open face;
    a second metallic member of different composition than the first metallic channel member;
    wherein the second metallic member is coupled to the first metallic channel member within a notched area of the open face of the first metallic channel member; and
    a third member coupled to the first metallic channel member, the third member defined as a fender for covering a tire.

19. The structure of claim 18, wherein the first metallic channel member is a casting.

20. The structure of claim 19, wherein the first metallic channel member is cast aluminum.

21. The structure of claim 20, wherein the first metallic channel member is cast AL ADC12.

22. The structure of claim 20, wherein the second metallic member is in the form of a plate.

23. The structure of claim 22, wherein the second metallic member is a stamped aluminum plate.

24. The structure of claim 23, wherein the second metallic member is stamped and formed of aluminum alloy 6061-T6.

25. The structure of claim 23, wherein the first metallic channel member has side walls which extend outwardly from a base wall, and the side walls are notched along an inside surface thereof to receive the second metallic member.

26. The structure of claim 25, wherein the notching includes a plurality of upstanding teeth.

27. The structure of claim 26, wherein a channel adjacent the upstanding teeth define an adhesive gap.

28. The structure of claim 27, wherein the second metallic member is coupled to the first metallic channel member by adhesive.

29. The structure of claim 28, wherein the first metallic channel member further comprises at least one threaded boss which upstands in the direction of the sidewalls and the second metallic member is further coupled to the first metallic channel member by way of a fastener extending through the second metallic member into the boss of the first metallic channel member.

30. The structure of claim 29, wherein the first metallic channel member further comprises a land portion, spaced from the at least one threaded boss, the land portion including a second threaded boss.

31. The structure of claim 30, wherein the first metallic channel member further comprises a raised portion, intermediate the first and second bosses, which supports the second metallic member.

32. The structure of claim 31, wherein the raised portion is defined in a cruciform shape.

33. The structure of claim 31, wherein the first metallic channel member further comprises a reduced thickness section on an outer surface of the base wall, intermediate the first and second bosses, which supports the third member, wherein the second metallic member extends beyond the reduced thickness section to at least partially overlap the third member.

34. A vehicle structural support, comprising:
    a first metallic member having first and second sides, the second side having a reduced thickness section;
    a second metallic member coupled to a notched area of the first side of the first metallic member;
    a third member coupled to the first metallic member and positioned in the reduced thickness section; and
    wherein the second metallic member extends beyond the reduced thickness section to at least partially overlap the third member, the second side being an outer surface of the first metallic member.

35. The structural support of claim 34, wherein the first metallic member is defined as a metallic channel member having an open face wherein the second metallic member is coupled over the open face of the first metallic channel member.

36. The structural support of claim 35, wherein the first metallic channel member is a casting.

37. The structural support of claim 36, wherein the first metallic channel member is cast aluminum.

38. The structural support of claim 37, wherein the first metallic channel member is cast AL ADC12.

39. The structural support of claim 37, wherein the second metallic member is in the form of a plate.

40. The structural support of claim 39, wherein the second metallic member is a stamped aluminum plate.

41. The structural support of claim 40, wherein the second metallic member is stamped and formed 6061-T6.

42. The structural support of claim 40, wherein the first metallic channel member has side walls which extend outwardly from a base wall, and the side walls are notched along an inside surface thereof to receive the second metallic member.

43. The structural support of claim 42, wherein the notching includes a plurality of upstanding teeth.

44. The structural support of claim 43, wherein the channels intermediate the teeth define an adhesive gap.

45. The structural support of claim 44, wherein the second metallic member is coupled to the first metallic channel member by adhesive.

46. The structural support of claim 45, wherein the first metallic channel member further comprises at least one threaded boss which upstands in the direction of the sidewalls and the second metallic member is further coupled to the first metallic channel member by way of a fastener extending through the second metallic member into the boss of the first metallic channel member.

47. The structural support of claim 46, wherein the first metallic channel member further comprises a land portion, spaced from the at least one threaded boss, the land portion including a second threaded boss.

48. The structural support of claim 47, wherein the first metallic channel member further comprises a raised portion, intermediate the first and second bosses, which supports the second metallic member.

49. The structural support of claim 48, wherein the raised portion is defined in a cruciform shape.

50. The structural support of claim 48, wherein the reduced thickness section is on an outer surface of the base wall.

51. The structural support of claim 34, wherein the third member is a fender.

52. The structural support of claim 51, wherein the first metallic channel member is substantially T-shaped, having a longitudinally extending portion and a vertically ending portion, where one end of the longitudinally extending portion includes a mount portion for coupling the fender to a vehicle.

53. The structural support of claim 34, wherein the reduced thickness section defines a tapered section.

54. The structural support of claim 34, wherein a portion of the first metallic member is positioned laterally between a portion of the second metallic member and a portion of the third member.

* * * * *